Patented Jan. 2, 1940

2,185,383

UNITED STATES PATENT OFFICE 2,185,383

PREPARATION OF LEVO-ASCORBIC ACID

Richard Pasternack, Brooklyn, and Gordon O. Cragwall, East Williston, N. Y., assignors to Charles Pfizer & Company, Brooklyn, N. Y., a corporation of New Jersey No Drawing. Application April 28, 1937, Serial No. 139,454

7 Claims. (Cl. 260—344)

This invention relates to the production of ascorbic acid and has for its object to provide a novel and improved process for this purpose.

It was discovered by Ohle (Angewandte Chemie 46, No. 25, pages 399–400, 1933) that the action of alkalies upon aqueous solutions of the esters of 2-keto-dextro-gluconic acid (d-glucosonic acid) caused a partial conversion to acids of the ascorbic type (to which he gave the name "Saccharosonic acids"). It was simultaneously shown by Maurer and Schiedt (Berichte 65B, pages 1054–7, 1933) that the methyl ester of 2-keto-dextro-gluconic acid is converted by means of sodium methylate and subsequent acidification to an isomer of ascorbic acid. This isomer differs from levo-ascorbic acid only in the position of the hydroxyl group on the fifth carbon atom.

It was to be expected that other 2-keto sugar acids would undergo a similar transformation. This has been demonstrated by Reichstein, who subsequently converted 2-keto-levo-gulonic acid to ascorbic acid through its methyl ester by the same method. This process has so far been the only one known which could be used to produce a satisfactory conversion of a 2-keto acid to the corresponding ascorbic type acid.

It has also been shown that 2-keto-dextro gluconic and 2-keto-levo-gulonic acids can be directly converted to the corresponding ascorbic type acids by means of either an acid or an alkaline solution. Micheel and Lohmann (Zeitschr. fuer physiologische Chemie, vol. 225:13–27, 1934) converted both to the corresponding ascorbic type acids by means of alkali. Reichstein showed in Helv. Chim. Acta, vol. 17:311–28 (1934), and especially page 315; that by heating 2-keto-levo-gulonic acid in aqueous solution either with or without the addition of small quantities of HCl, a minor proportion of ascorbic acid was formed. These direct conversions either in acid or alkaline solution were unsatisfactory, because there was an accompanying reaction resulting in destruction of the molecule, and a substantial portion of the ascorbic acid formed was lost thereby.

We have now been able to devise a process which makes it possible to convert 2-keto-levo-gulonic acid and its readily hydrolyzable derivatives almost quantitatively to levo-ascorbic acid. Our process involves the combined, but that is simultaneous, action of a suitable solvent exerting a protective effect upon the hydroxyl groups of the keto-gulonic acid, and a sufficient amount of a non-oxidizing acid stronger than phosphoric acid to make the converting solution of at least twice normal strength. Obviously, acids exerting an oxidizing effect are to be avoided, and in general we prefer hydrochloric acid for the purpose, although sulfuric acid which does not show much oxidizing tendency under the conditions of the process will also give excellent results. Hydrobromic acid may be used, but phosphoric acid and even such a comparatively strong organic acid as oxalic acid have not been found suitable as converting agents. There is no advantage in adding more hydrochloric acid than is necessary to make the solution of twice normal strength, since such excess acid is soon lost by volatilization thru the reflux condenser.

As solvents we prefer to use glacial acetic acid or dioxan, or mixtures of the two. Somewhat less suitable are concentrated phosphoric acid or concentrated sulfuric acid. It is interesting to note that surfuric acid may thus serve as both solvent and converting agent.

Alcohols such as ethyl or propyl alcohol or ethylene glycol are not as good as the four solvents named above, since alcohol cannot react with the hydroxyl groups of the keto-gulonic acid and therefore do not act as protective solvents, although in their presence conversion is better and destruction of the resulting ascorbic acid is less than with water and acid alone.

Although the reaction takes place under practically anhydrous conditions, we prefer the presence of water, although always in a minor proportion as compared to the other solvents. Heating with the above mentioned solvents alone (excepting of course concentrated sulfuric acid) does not cause any worthwhile degree of conversion; while most acids strong enough to be satisfactory converting agents, when used alone are very destructive to ascorbic acid. This is especially true of strong hydrochloric acid. It is therefore an unexpected result that the proper combination of solvent and strong acid makes possible practically quantitative conversion of 2-keto-levo-gulonic acid to ascorbic acid without material destruction of the ascorbic acid.

After completing the conversion care must be taken to remove the mineral acid as soon and as completely as possible before attempting the crystallization of the ascorbic acid. In the case of hydrochloric acid this can be accomplished by repeated evaporation under vacuum. In the case of sulfuric acid, it is necessary to dilute with a considerable quantity of ice water and neutralize with a suitable alkali. We prefer to use a calcium compound for such neutralization. Obviously it is easier to remove hydrochloric acid, and we find it in many cases the preferable converting agent.

When using glacial acetic acid as solvent, partial acetylation of the hydroxyl groups takes place, which inhibits the crystallization of the product. By boiling with alcohols, the acetyl radicals are removed as the volatile acetates; methyl alcohol is a desirable selection for this purpose. The partial acetylation appears to be of considerable effect in preventing decomposition of the resulting ascorbic acid. Apparently dioxan has a somewhat similar protective action, although we do not know the structure of the compound formed. Phosphoric and sulfuric acid, when used as solvents, are believed to partially esterify the hydroxyl groups.

In addition to increasing the obtainable yield of levo-ascorbic acid as described above, we have found that our process involving the simultaneous action of a protective solvent and a non-oxidizing strong acid also materially accelerates the conversion.

*Example I.*—300 g. of 2-keto-levo-gulonic acid are dissolved in 2000 cc. of glacial acetic acid. 550 cc. of concentrated hydrochloric acid are added to serve as a converting agent, since acetic acid is not a sufficiently strong acid to induce suitable conversion. The mixture is heated on the steam bath under reflux for ½ hour at 90–95° C. Iodine titration shows a conversion of 97.8%. The mixture is now evaporated to dryness under a 27" vacuum, dedissolved in water, treated with decolorizing charcoal to remove the dark residue and filtered. The filtrate is again evaporated to dryness under reduced pressure to remove the last traces of hydrochloric acid, redissolved in methyl alcohol and re-evaporated to dryness under vacuum to remove methyl acetate. This residue is recrystallized from methyl alcohol in the usual manner. The crude material after recrystallization from methyl alcohol yields a white crystalline ascorbic acid, showing by iodine titration a purity of 99.5 to 100%. In 10% solution $$(\alpha)_D^{25°} = 20.7$$

melting point 192°. By reworking all mother liquors, the total yield is 85% of theory or better.

*Example II.*—452 g. of diacetone-2-keto-levo-gulonic acid are dissolved in 1590 cc. of glacial acetic acid, 442 cc. of concentrated hydrochloric acid are added and the mixture is heated on the steam bath under reflux for 1 hour at 85–90° C. The conversion, as shown by iodine titration, is about 98%. The product is worked up by the same process as in Example 1, giving a total yield of the same amount and of the same purity.

*Example III.*—452 g. of diacetone 2-keto-levo-gulonic acid, 1600 cc. glacial acetic acid, and 160 cc. concentrated sulfuric acid, are heated on the steam bath as before at 90–90° for 75 minutes. The indicated conversion is 90.7%. It is immediately poured into an aqueous mixture made up from 965 cc. water, 400 cc. acetic acid and 300 g. calcium carbonate. The precipitated gypsum is filtered out and washed, and the combined filtrates and washings are worked up as before. Crystallization is somewhat more difficult, possibly owing to the formation of a sulfuric ester of ascorbic acid. The product after recrystallization from alcohol titrates with iodine 99.5 to 100% and $$(\alpha)_D^{25°} = 20.95$$

The total yield is some 78%.

*Example IV.*—452 g. of diacetone-2-keto-levo-gulonic acid, 1600 cc. of dioxan, 443 cc. concentrated C. P. hydrochloric acid, reflux on the steam bath at about 88° C. for 1½ hours. Iodine titration shows a conversion of 93.3%. Evaporate to dryness under reduced pressure to remove HCl, redissolve in water and work up as before. The first crop consists of 173 g. of well formed crystalline ascorbic acid of good purity:

$$(\alpha)_D^{25°} = 20.9$$

Titration is 99.5 to 100%. Further amounts can be obtained from the mother liquors, so that the total yield is at least 85%.

*Example V.*—100 g. of diacetone-2-keto-levo-gulonic acid, 175 cc. concentrated sulfuric acid (96%), heat on the steam bath for 5 minutes during which time heat of reaction raises the temperature to 110°. Drown in ice water, make neutral to Congo red with calcium carbonate, warm to 90° and hold for ½ hour. After filtering out the precipitated gypsum, the solution is worked up as above. The product after recrystallization from methyl alcohol has a rotation:

$$(\alpha)_D^{25°} = 20.95$$

and titrates 99.5 to 100%.

By the word "concentrated" as used in the claims with reference to acids, we refer to acids of a concentration comparable to commercial concentrated sulfuric acid, commercial concentrated phosphoric acid, etc.

We claim:

1. Process of converting 2-keto-levo-gulonic acid and its readily hydrolyzable derivatives to levo-ascorbic acid by the combined action of a solvent capable of reacting with the hydroxyl groups of the 2-keto-levo-gulonic acid and a sufficient amount of concentrated hydrochloric acid to make with the protective solvent a hydrochloric acid solution of twice normal strength.

2. Process of converting 2-keto-levo-gulonic acid and its readily hydrolyzable derivatives to levo-ascorbic acid by the combined action of glacial acetic acid and a sufficient amount of concentrated sulfuric acid to make the solution of at least twice normal strength.

3. Process of converting 2-keto-levo-gulonic acid and its readily hydrolyzable derivatives to levo-ascorbic acid by the simultaneous action of a solvent capable of reacting with the hydroxyl groups of the 2-keto-levo-gulonic acid and a substantially non-oxidizing acid stronger than phosphoric acid in an amount sufficient to make the solution of at least twice normal strength.

4. Process for the preparation of ascorbic acid by the action of a substantially non-oxidizing acid stronger than phosphoric acid and of at least twice-normal concentration, and a reactant selected from the group consisting of dioxan, glacial acetic acid, concentrated phosphoric acid and concentrated sulfuric acid, upon 2-keto-levo-gulonic acid or its readily hydrolyzable derivatives, said action resulting in the formation of an ascorbic acid compound which is substantially unaffected by the strong acid, and converting the ascorbic acid compound to ascorbic acid by subsequent hydrolysis.

5. In the process of converting 2-keto-levo-gulonic acid to ascorbic acid, the step of combining hydroxyl groups of the 2-keto-levo-gulonic acid with a member selected from the group consisting of dioxan, glacial acetic acid, concentrated phosphoric acid and concentrated sulfuric acid by reacting 2-keto-levo-gulonic acid with the selected member in the presence of at least a twice-normal concentration of a substantially non-oxidizing acid stronger than phosphoric acid.

6. Process of converting 2-keto-levo-gulonic acid and its readily hydrolyzable derivatives to levo-ascorbic acid by the combined action of glacial acetic acid and a sufficient amount of concentrated hydrochloric acid to make the solution of at least twice normal strength.

7. Process for producing levo-ascorbic acid which comprises subjecting 2-keto-levo-gulonic acid of its readily hydrolyzable derivatives to the simultaneous action of glacial acetic acid and a sufficient amount of concentrated hydrochloric acid to make the solution of at least twice normal strength, whereby to produce acetyl derivatives of ascorbic acid, and converting said acetyl derivatives to ascorbic acid by subsequent hydrolysis.

RICHARD PASTERNACK.
GORDON O. CRAGWALL.

CERTIFICATE OF CORRECTION.

Patent No. 2,185,383. January 2, 1940.

RICHARD PASTERNACK, ET AL.

It is hereby certified that error appears in the printed specification of the above numbered patent requiring correction as follows: Page 2, first column, line 61, Example III, for "90-90°" read 90-95°; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.